US012006736B2

(12) United States Patent
Lin

(10) Patent No.: US 12,006,736 B2
(45) Date of Patent: Jun. 11, 2024

(54) FOLDING LOCK

(71) Applicant: Yu-Pin Lin, Tainan (TW)

(72) Inventor: Yu-Pin Lin, Tainan (TW)

( * ) Notice: Subject to any disclaimer, the term of this patent is extended or adjusted under 35 U.S.C. 154(b) by 468 days.

(21) Appl. No.: 17/445,830

(22) Filed: Aug. 25, 2021

(65) Prior Publication Data

US 2023/0069148 A1 Mar. 2, 2023

(51) Int. Cl.
*E05B 71/00* (2006.01)
*E05B 27/00* (2006.01)

(52) U.S. Cl.
CPC .......... *E05B 71/00* (2013.01); *E05B 27/0003* (2013.01)

(58) Field of Classification Search
CPC ...... E05B 71/00; E05B 73/00; E05B 73/0005; E05B 67/06; E05B 67/08; E05B 67/10; E05B 67/22; E05B 67/103
See application file for complete search history.

(56) References Cited

U.S. PATENT DOCUMENTS 7,437,898 B2 * 10/2008 Su .......................... E05B 67/003
70/423
7,481,084 B1 * 1/2009 Wu .......................... E05B 67/003
70/52
2022/0251877 A1 * 8/2022 Wehr ...................... E05B 71/00

FOREIGN PATENT DOCUMENTS

| | | | | | |
|---|---|---|---|---|---|
| CN | 109854100 A | * | 6/2019 | | |
| DE | 102013108058 A1 | * | 1/2015 | ........... | E05B 67/003 |
| DE | 102013114054 A1 | * | 6/2015 | ........... | E05B 67/003 |
| DE | 202019102460 U1 | * | 6/2019 | ........... | E05B 67/003 |
| DE | 102018006121 A1 | * | 2/2020 | | |
| DE | 102019123477 A1 | * | 3/2021 | ........... | E05B 17/002 |
| DE | 202021101100 U1 | * | 4/2021 | | |
| KR | 200479132 Y1 | * | 12/2015 | | |

* cited by examiner

*Primary Examiner* — Alyson M Merlino

(57) ABSTRACT

A folding lock comprises a folding plate assembly, a lock seat, a fixing sleeve, a lock core seat, a lock core, a connecting swivel, a lock column, and a fixing collar. A fixed folding plate of the assembly is provided with a connecting seat, the lock seat is disposed on the connecting seat and provided with an insertion hole, an inlay protrudes from the insertion hole, the fixing sleeve inserts into the connecting seat and disposes in the lock seat, the lock core disposes in the lock core seat, the connecting swivel is assembled on the lock core seat, a torsion spring disposes between the lock core seat and the connecting swivel, the lock column is assembled on the connecting swivel, a compression spring is sleeved on the connecting swivel and the lock column, and the fixing collar is disposed in the fixing sleeve.

3 Claims, 9 Drawing Sheets

FOLDING LOCK

BACKGROUND OF THE INVENTION

1. Field of Invention

The invention relates to a folding lock, and more particularly to a folding lock capable of further embedding and fastening a lock column to prevent thieves from push-opening an insertion groove of a lock seat to achieve an optimum anti-theft efficacy of locking.

2. Related Art

Locks commonly used to fix items in a position to prevent items (such as bicycles) from being stolen include cable lock, U-shaped lock and folding lock. Although there are many types of locks available for locking items, folding lock is still the most convenient, mainly because cable lock and U-shaped lock are large in size and heavy, and take up a lot of space when being stored away. Folding lock can be folded to minimize the volume to make the volume relatively occupy less space when being stored away. Most of the general folding locks are provided with an insertion groove on the lock seat for the end portion of the folding plate to be inserted, and the lock core is linked with the lock column to insert into the insertion hole of the folding plate to complete the locking action. However, the insertion groove of the lock seat of the conventional folding lock can be easily push-opened by thieves using a tool to detach the lock column from the insertion hole of the folding plate, and thus the locking efficacy is lost and the anti-theft effect is still not ideal.

SUMMARY OF THE INVENTION

A main object of the invention is to provide a folding lock capable of effectively solving the drawbacks of the conventional folding lock.

A folding lock of the invention is mainly provided with:

a folding plate assembly composed of a fixed folding plate, a movable folding plate, a plurality of intermediate folding plates and a plurality of rivets, the fixed folding plate, the movable folding plate and the intermediate folding plates being pivotally assembled by riveting with the rivets one by one, the fixed folding plate and the movable folding plate being respectively pivotally disposed on two outer sides of the intermediate folding plates, the fixed folding plate being fixedly provided with a connecting seat, the connecting seat being provided with a through hole, an outer end of the movable folding plate being disposed as an insertion portion, the insertion portion being provided with an insertion hole;

a lock seat disposed on an inner side of the connecting seat on the fixed folding plate, one end of the lock seat being provided with an accommodating groove, a wall surface of the lock seat being provided with an insertion groove, the accommodating groove communicating with the insertion groove, another end of the lock seat being provided with an insertion hole, the insertion hole of the lock seat communicating with the insertion groove, an inlay being correspondingly protruding from an inner wall surface of the insertion hole;

a fixing sleeve inserted into the through hole of the connecting seat on the fixed folding plate and disposed in the accommodating groove of the lock seat, an outer wall surface of one end portion of the fixing sleeve being provided with a flange, inside the fixing sleeve being provided with a chamber, an outer end portion of the chamber of the fixing sleeve being provided with a ring groove, a wall surface of the chamber of the fixing sleeve being axially provided with a sliding groove, and vertically provided with an arcuate positioning embedding groove, another end portion of the fixing sleeve being provided with a perforation communicating with the chamber;

a lock core seat disposed in the chamber of the fixing sleeve, one end of the lock core seat being provided with a chamber, an inner wall surface of the chamber of the lock core seat being provided with a positioning slot, another end of the lock core seat being provided with a perforation communicating with the chamber, an outer wall surface of the lock core seat being provided with a positioning protrusion for disposing in the sliding groove of the fixing sleeve, a wall surface of the lock core seat being provided with a steel ball hole communicating with the perforation of the lock core seat, inside the steel ball hole being provided with a positioning steel ball, another end face of the lock core seat being provided with a fixing insert hole;

a lock core disposed in the chamber of the lock core seat, one end of the lock core being provided with a key hole, another end of the lock core being provided with a lock rod, the lock rod being provided with a notch, a wall surface of the lock core being provided with an embedding rod for embedding in the positioning slot of the lock core seat;

a connecting swivel assembled on the lock core seat, one end of the connecting swivel being provided with a protruding column, the protruding column of the connecting swivel being inserted into the perforation of the lock core seat, inside the protruding column of the connecting swivel being provided with a lock rod hole for inserting the lock rod of the lock core, the protruding column of the connecting swivel being provided with a slot, another end of the connecting swivel being provided with a connecting protrusion, inside the connecting protrusion being provided with a perforation, a first pin hole being disposed on a wall surface of the connecting swivel, a first fixing pin being disposed in the first pin hole, the first fixing pin being inserted into the notch of the lock rod of the lock core, a second pin hole being provided on a wall surface of the connecting protrusion, a second fixing pin being disposed in the second pin hole, a fixing insert hole being disposed on an end face of the connecting swivel, a torsion spring being disposed between the connecting swivel and the lock core seat, one end of the torsion spring being embedded in the fixing insert hole of the connecting swivel, another end of the torsion spring being embedded in the fixing insert hole of the lock core seat;

a lock column disposed on the connecting swivel, one end of the lock column being provided with a protruding column, the protruding column of the lock column being disposed in the perforation of the connecting swivel, the protruding column of the lock column being provided with a pin hole for inserting the second fixing pin on the connecting swivel, the lock column being provided with a retaining edge, another end portion of the lock column being provided with an embedding groove, a cut surface provided on a wall surface of the other end portion of the lock column corresponding to a position of the inlay in the insertion hole of the lock seat, a compression spring being sleeved on the connecting swivel and the lock column; and a fixing collar disposed in the chamber of the fixing sleeve, a C-shaped fastening ring being disposed on a wall surface of the fixing collar, and the C-shaped fastening ring being embedded in the ring groove of the fixing sleeve.

In the folding lock of the invention, wherein an outer end portion of the through hole of the connecting seat of the folding plate assembly is provided with a retaining edge, the flange of the fixing sleeve is retained and positioned by the retaining edge of the connecting seat, a spiral flange is disposed on a wall surface of the accommodating groove of the lock seat, and a spiral embedding groove for fitting with the spiral flange of the lock seat is disposed on the outer wall surface of the fixing sleeve.

In the folding lock of the invention, wherein at least one pin hole is provided on a wall surface of one end portion of the lock core seat, inside the pin hole is provided with a fixing pin, an anti-drilling component is provided on the lock core seat, the anti-drilling component is provided with a protrusion, the protrusion of the anti-drilling component is disposed in the chamber of the lock core seat, the protrusion of the anti-drilling component is provided with a ring groove for inserting the fixing pin of the lock core seat, and the anti-drilling component is provided with a key insertion hole.

The advantages of the folding lock of the invention are: the lock column can be further embedded and fastened to prevent thieves from push-opening the insertion groove of the lock seat, and the lock core structure has an anti-drilling function to achieve an optimum anti-theft efficacy.

DETAILED DESCRIPTION OF THE INVENTION

Figure 1:
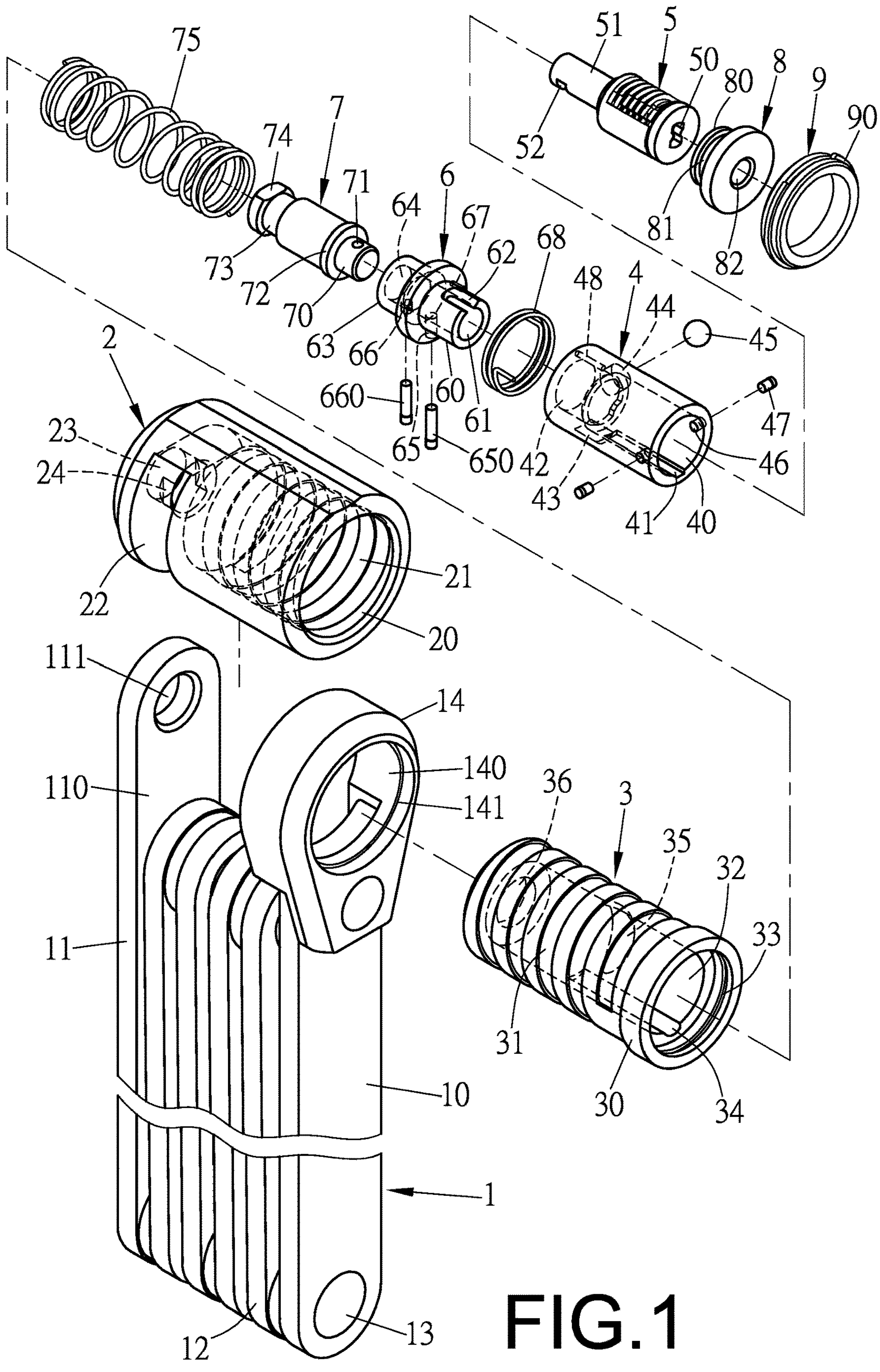
FIG. 1 is a perspective exploded view according to one embodiment of the invention.
Figure 2:
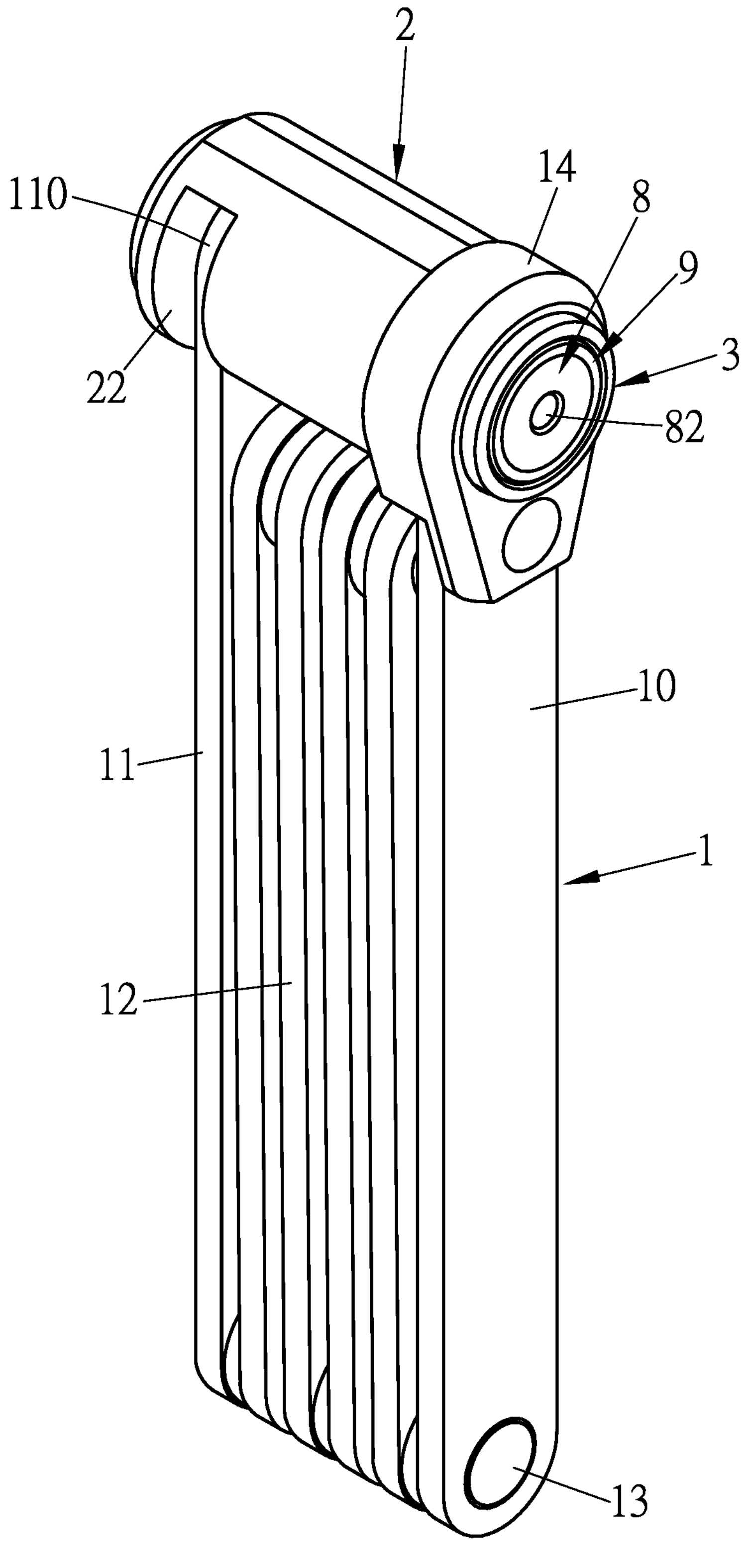
FIG. 2 is a perspective assembly view according to one embodiment of the invention.

Regarding the technical means adopted by the invention to achieve the above-mentioned object and efficacy, a preferred and feasible embodiment is explained in details hereunder in conjunction with the figures.

Figure 3:
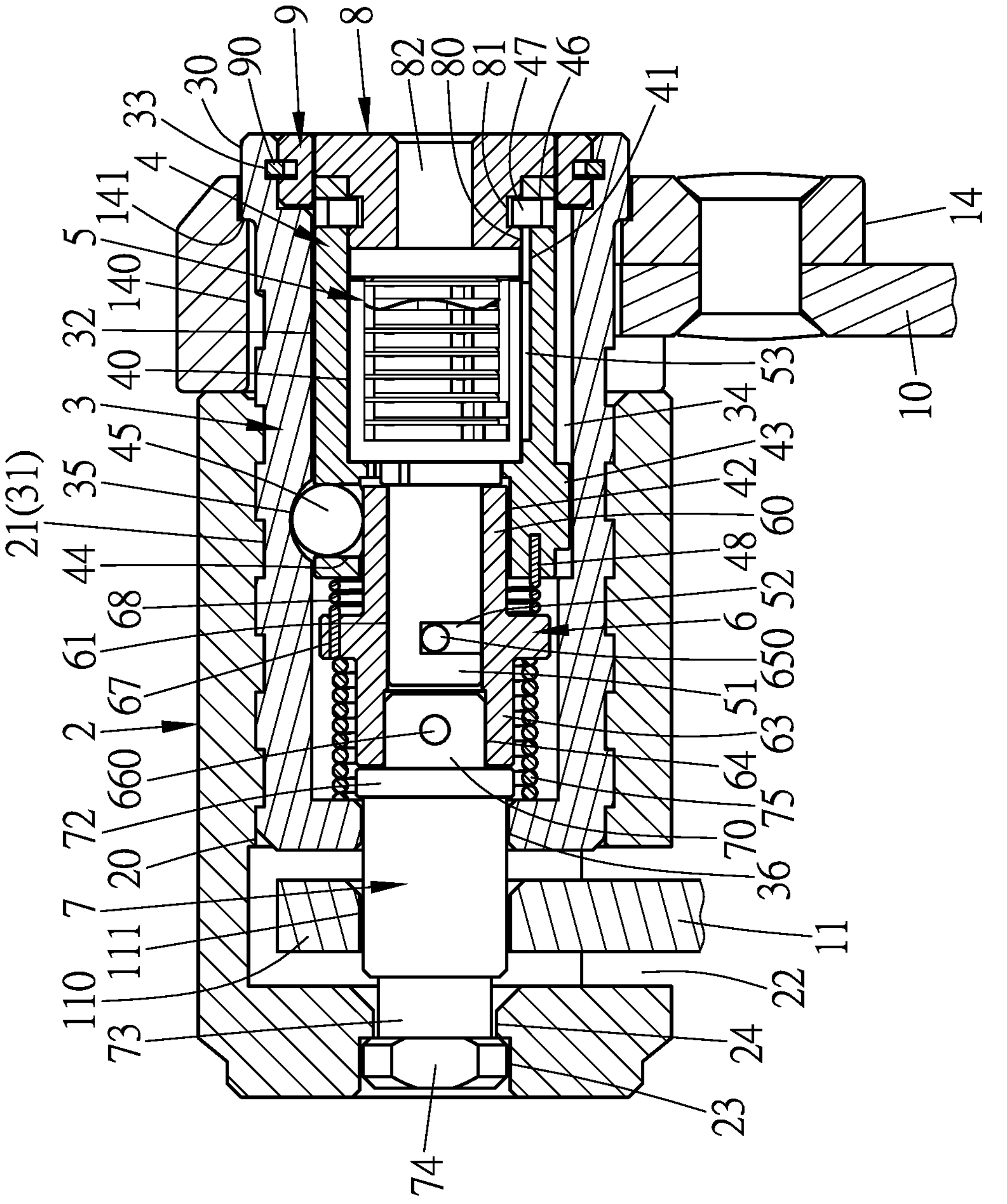
FIG. 3 is a cross-sectional assembly view according to one embodiment of the invention.

For one embodiment of the invention, please refer to FIGS. 1 to 5, a folding lock of the invention is mainly provided with:

a folding plate assembly 1 composed of a fixed folding plate 10, a movable folding plate 11, a plurality of intermediate folding plates 12 and a plurality of rivets 13, the fixed folding plate 10, the movable folding plate 11 and the intermediate folding plates 12 being pivotally assembled by riveting with the rivets 13 one by one, the fixed folding plate 10 and the movable folding plate 11 being respectively pivotally disposed on two outer sides of the intermediate folding plates 12, the fixed folding plate 10 being fixedly provided with a connecting seat 14, the connecting seat 14 being provided with a through hole 140, an outer end portion of the through hole 140 being provided with a retaining edge 141, an outer end of the movable folding plate 11 being disposed as an insertion portion 110, the insertion portion 110 being provided with an insertion hole 111;

a lock seat 2 disposed on an inner side of the connecting seat 14 on the fixed folding plate 10, one end portion of the lock seat 2 being provided with an accommodating groove 20, a spiral flange 21 being disposed on a wall surface of the accommodating groove 20, a wall surface of the lock seat 2 being provided with an insertion groove 22, the accommodating groove 20 communicating with the insertion groove 22, another end portion of the lock seat 2 being provided with an insertion hole 23, the insertion hole 23 communicating with the insertion groove 22, an inlay 24 being correspondingly protruding from an inner wall surface of the insertion hole 23;

a fixing sleeve 3 inserted into the through hole 140 of the connecting seat 14 on the fixed folding plate 10 and disposed in the accommodating groove 20 of the lock seat 2, an outer wall surface of one end portion of the fixing sleeve 3 being provided with a flange 30, the flange 30 being retained and positioned by the retaining edge 141 of the connecting seat 14, a spiral embedding groove 31 for fitting with the spiral flange 21 of the lock seat 2 being disposed on the outer wall surface of the fixing sleeve 3, inside the fixing sleeve 3 being provided with a chamber 32, an outer end portion of the chamber 32 being provided with a ring groove 33, a wall surface of the chamber 32 being axially provided with a sliding groove 34, and vertically provided with an arcuate positioning embedding groove 35, another end portion of the fixing sleeve 3 being provided with a perforation 36 communicating with the chamber 32;

a lock core seat 4 disposed in the chamber 32 of the fixing sleeve 3, inside one end of the lock core seat 4 being provided with a chamber 40, an inner wall surface of the chamber 40 being provided with a positioning slot 41, another end of the lock core seat 4 being provided with a perforation 42 communicating with the chamber 40, an outer wall surface of the lock core seat 4 being provided with a positioning protrusion 43 for disposing in the sliding groove 34 of the fixing sleeve 3, a wall surface of the lock core seat 4 being provided with a steel ball hole 44 communicating with the perforation 42, inside the steel ball hole 44 being provided with a positioning steel ball 45, at least one pin hole 46 being provided on a wall surface of one end portion of the lock core seat 4, inside the pin hole 46 being provided with a fixing pin 47, another end face of the lock core seat 4 being provided with a fixing insert hole 48;

a lock core 5 disposed in the chamber 40 of the lock core seat 4, one end of the lock core 5 being provided with a key hole 50, another end of the lock core 5 being provided with a lock rod 51, the lock rod 51 being provided with a notch 52, a wall surface of the lock core 5 being provided with an embedding rod 53 for embedding in the positioning slot 41 of the lock core seat 4 (as shown in FIG. 3);

a connecting swivel 6 assembled on the lock core seat 4, one end of the connecting swivel 6 being provided with a protruding column 60, the protruding column 60 being inserted into the perforation 42 of the lock core seat 4, inside the protruding column 60 being provided with a lock rod hole 61 for inserting the lock rod 51 of the lock core 5, the protruding column 60 being provided with a slot 62, another end of the connecting swivel 6 being provided with a connecting protrusion 63, inside the connecting protrusion 63 being provided with a perforation 64, a first pin hole 65 being disposed on a wall surface of the connecting swivel 6, a first fixing pin 650 being disposed in the first pin hole 65, a second pin hole 66 being provided on a wall surface of the connecting protrusion 63, a second fixing pin 660 being disposed in the second pin hole 66, a fixing insert hole 67 being disposed on an end face of the connecting swivel 6, a torsion spring 68 being disposed between the connecting swivel 6 and the lock core seat 4, one end of the torsion spring 68 being embedded in the fixing insert hole 67 of the connecting swivel 6, another end of the torsion spring 68 being embedded in the fixing insert hole 48 of the lock core seat 4;

a lock column 7 disposed on the connecting swivel 6, one end of the lock column 7 being provided with a protruding column 70, the protruding column 70 being provided with a pin hole 71, the lock column 7 being provided with a retaining edge 72, another end portion of the lock column 7 being provided with an embedding groove 73, a cut surface 74 provided on a wall surface of the other end portion of the lock column 7 corresponding to a position of the inlay 24 in the insertion hole 23 of the lock seat 2, a compression spring 75 being sleeved on the connecting swivel 6 and the lock column 7;

an anti-drilling component 8 provided on the lock core seat 4, the anti-drilling component 8 being provided with a protrusion 80, the protrusion 80 being disposed in the chamber 40 of the lock core seat 4, the protrusion 80 being provided with a ring groove 81, the anti-drilling component 8 being provided with a key insertion hole 82; and a fixing collar 9 disposed in the chamber 32 of the fixing sleeve 3, a C-shaped fastening ring 90 being disposed on a wall surface of the fixing collar 9, and the C-shaped fastening ring 90 being embedded in the ring groove 33 of the fixing sleeve 3, in this way, forming a folding lock structure.

Figure 4:
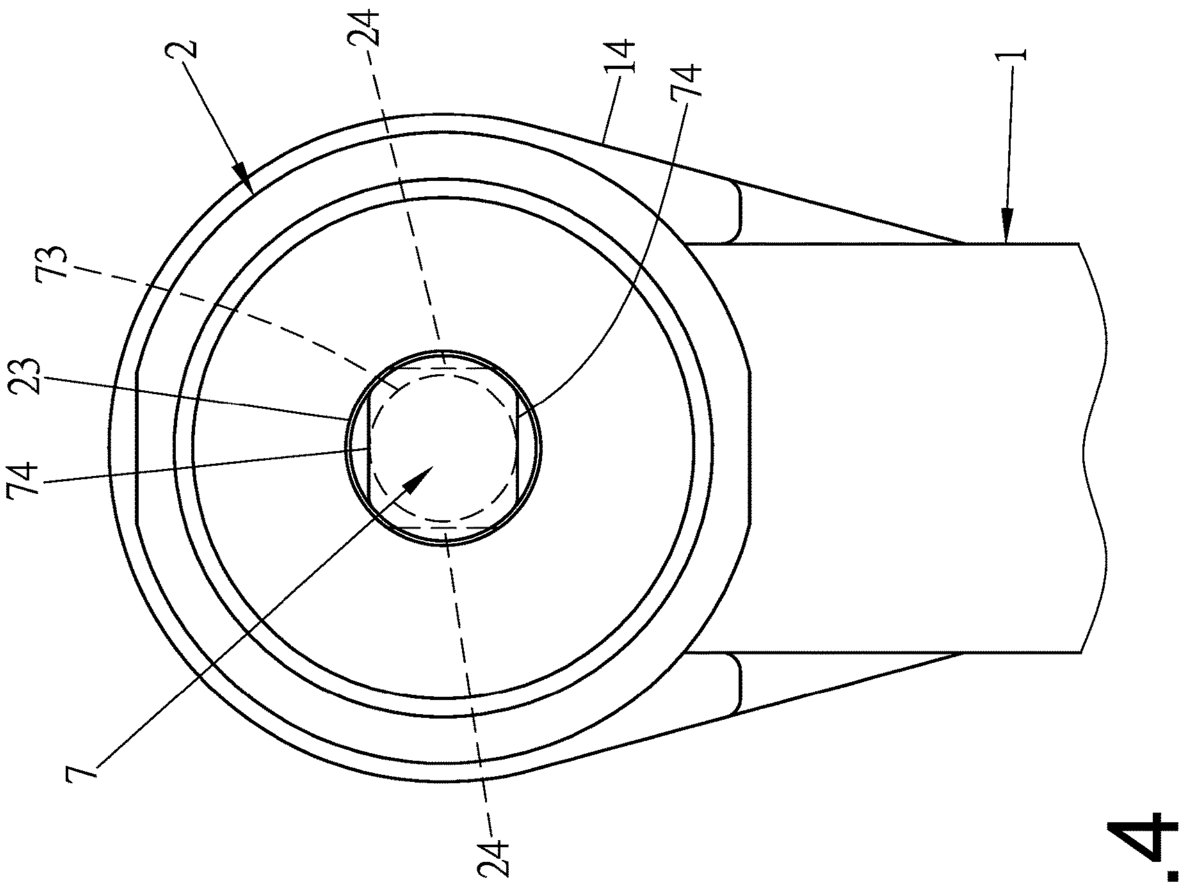
FIG. 4 is a plan view of an end portion of a lock column embedding and fastening with a lock seat according to one embodiment of the invention.
Figure 5:
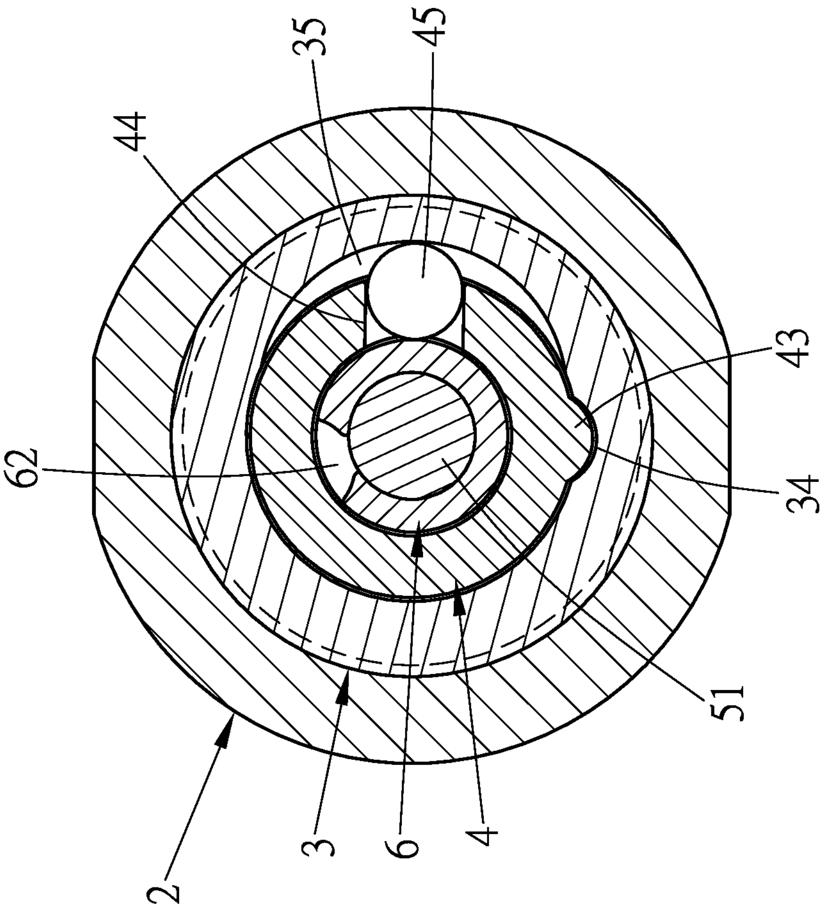
FIG. 5 is a cross-sectional view of a positioning steel ball being positioned by embedding and fastening according to one embodiment of the invention.
Figure 6:
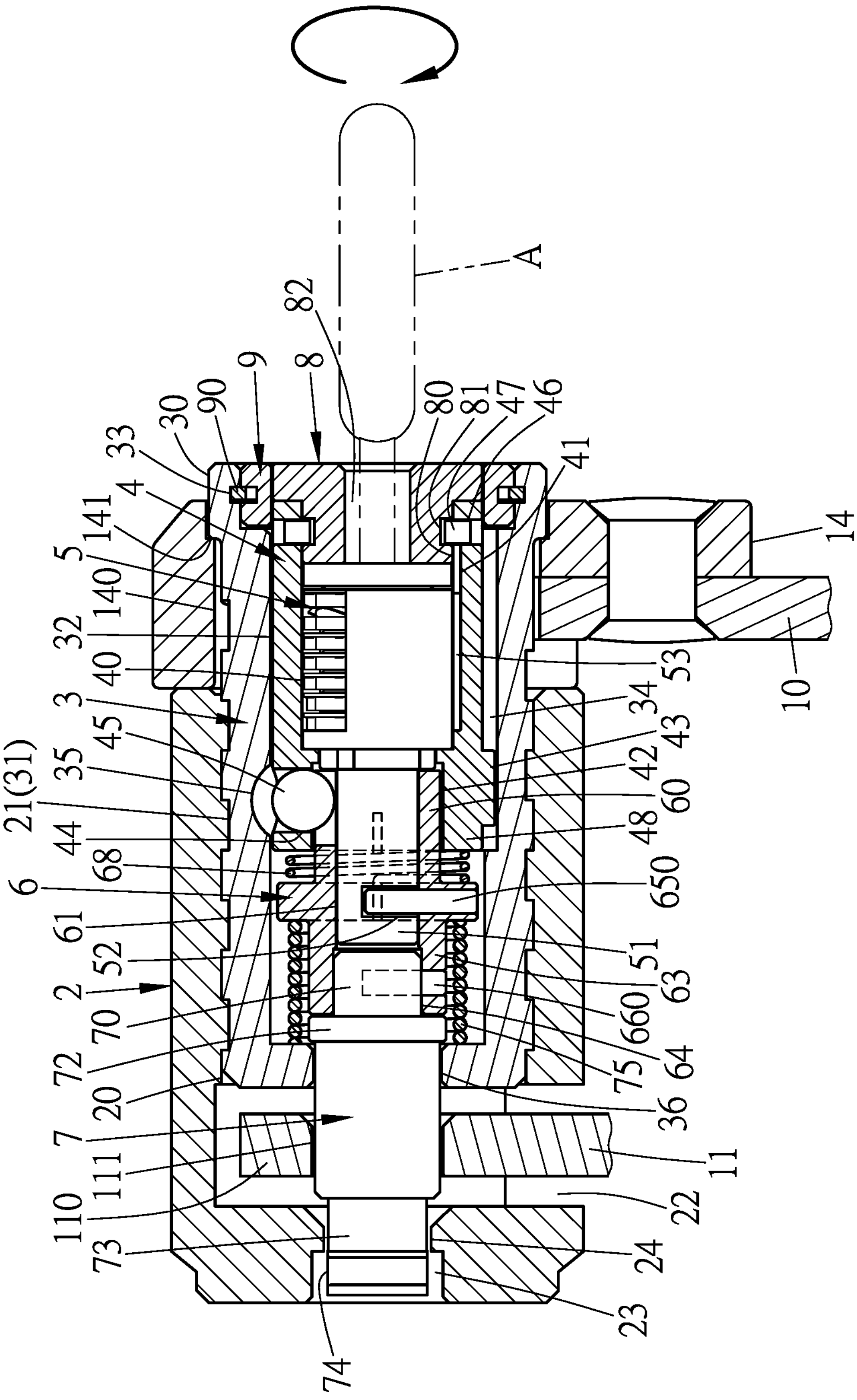
FIG. 6 is a cross-sectional view of unlocking a lock core by turning with a key according to one embodiment of the invention.

Please refer to FIGS. 1 to 6 for assembling of the invention. First, disposing the lock seat 2 on the inner side of the connecting seat 14 of the folding plate assembly 1, and then inserting the fixing sleeve 3 from an outer side of the connecting seat 14 into the through hole 140 and disposing the fixing sleeve 3 in the accommodating groove 20 of the lock seat 2. By embedding and fixing the spiral embedding groove 31 of the fixing sleeve 3 with the spiral flange 21 of the lock seat 2, and with the flange 30 of the fixing sleeve 3 being retained and positioned by the retaining edge 141 of the connecting seat 14, the lock seat 2 and the fixing sleeve 3 are fixed on the connecting seat 14. The protruding column 70 of the lock column 7 is inserted into the perforation 64 of the connecting swivel 6, and by inserting the second fixing pin 660 on the connecting swivel 6 into the pin hole 71 of the lock column 7, the lock column 7 is fixed with the connecting swivel 6. The torsion spring 68 is sleeved on the connecting swivel 6, one of the ends of the torsion spring 68 is inserted into the fixing insert hole 67 of the connecting swivel 6, the protruding column 60 of the connecting swivel 6 is inserted into the perforation 42 of the lock core seat 4, the other end of the torsion spring 68 is inserted into the fixing insert hole 48 of the lock core seat 4, the lock core 5 is placed in the chamber 40 of the lock core seat 4, the lock rod 51 of the lock core 5 is inserted into the lock rod hole 61 of the connecting swivel 6, and the first fixing pin 650 of the connecting swivel 6 is inserted into the notch 52 of the lock rod 51, so that the connecting swivel 6 is assembled with the lock core seat 4 and the lock core 5. The slot 62 of the connecting swivel 6 corresponds to a position of the steel ball hole 44 of the lock core seat 4, and the positioning steel ball 45 is disposed in the steel ball hole 44 of the lock core seat 4 and the slot 62 of the connecting swivel 6 (as shown in FIG. 6). The protrusion 80 of the anti-drilling component 8 is disposed into an end portion of the chamber 40 of the lock core seat 4, and by inserting the fixing pin 47 on the lock core seat 4 into the ring groove 81 of the anti-drilling component 8, the anti-drilling component 8 is assembled on the end portion of the lock core seat 4 and can be freely rotated on the lock core seat 4. The compression spring 75 is sleeved on the connecting swivel 6 and the lock column 7, the above assembled lock core seat 4, lock core 5, torsion spring 68, connecting swivel 6, lock column 7, compression spring 75 and anti-drilling component 8 are placed into the chamber 32 of the fixing sleeve 3, the lock column 7 is inserted through the perforation 36 of the fixing sleeve 3 into the insertion groove 22 of the lock seat 2, the end portion of the lock column 7 is inserted into the insertion hole 23 of the lock seat 2, the fixing collar 9 is disposed in the chamber 32 of the fixing sleeve 3, the C-shaped fastening ring 90 is embedded in the ring groove 33 of the fixing sleeve 3, and the fixing collar 9 is fixed in the fixing sleeve 3, thereby the lock core seat 4 is positioned in the fixing sleeve 3, and the whole assembly can be completed.

Figure 7:
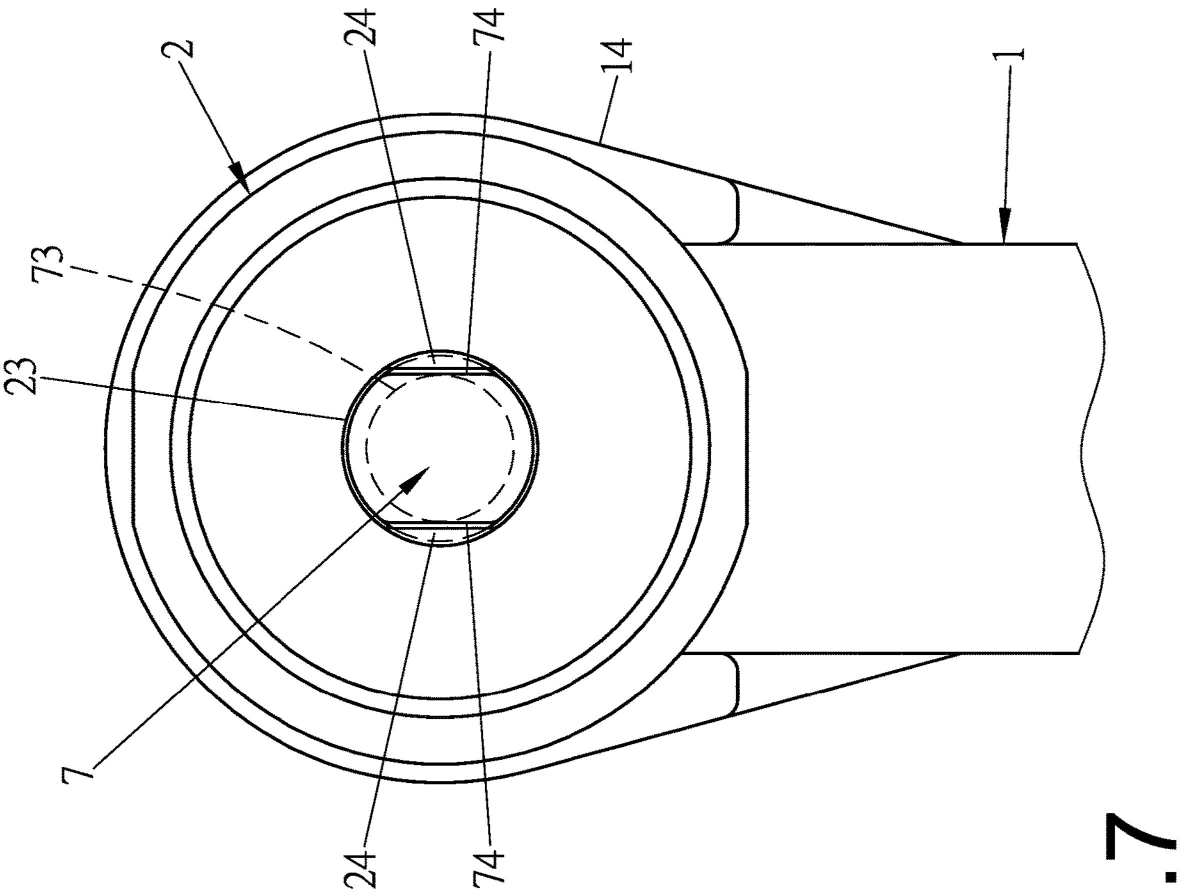
FIG. 7 is a plan view of unlocking the end portion of the lock column and the lock seat according to one embodiment of the invention.
Figure 8:
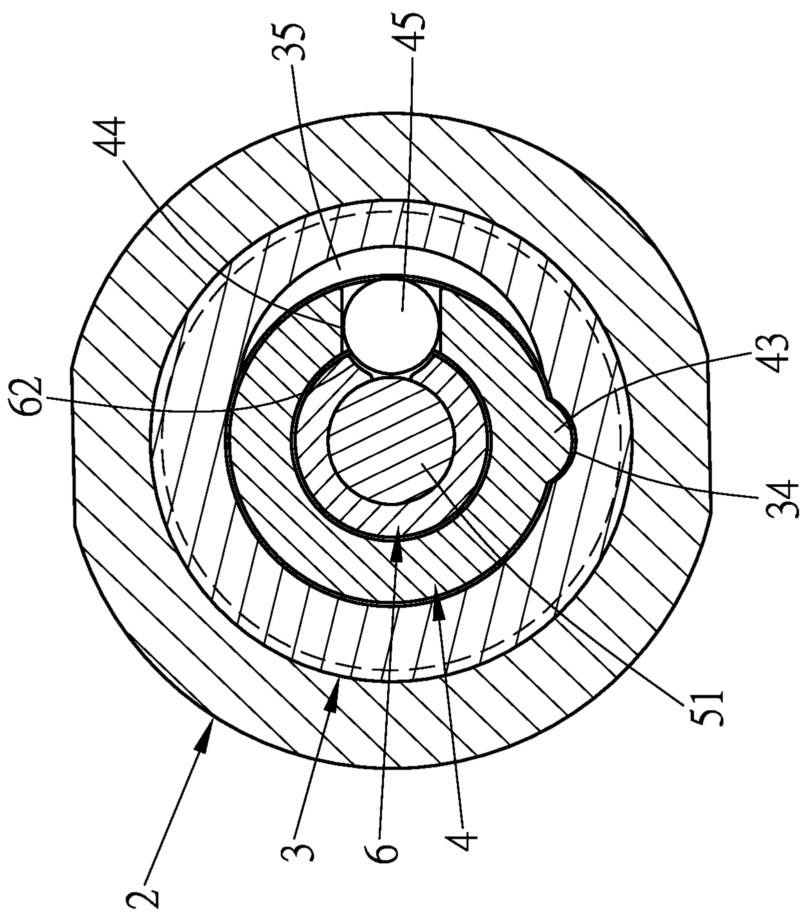
FIG. 8 is a cross-sectional view of the positioning steel ball being unlocked according to one embodiment of the invention.
Figure 9:
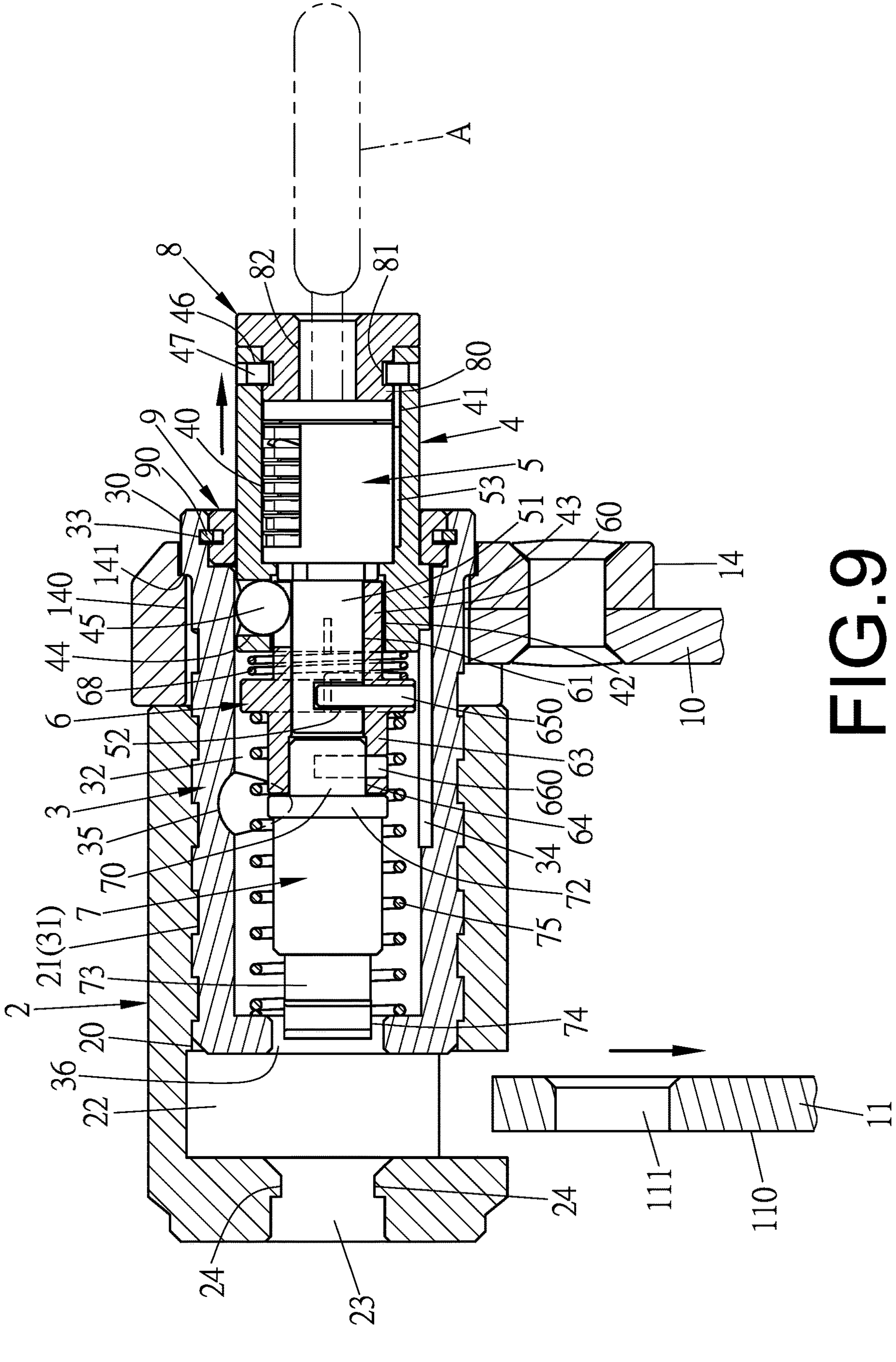
FIG. 9 is a cross-sectional view of an unlocked state of the lock column detached from an insertion groove of the lock seat according to one embodiment of the invention.

Please refer to FIGS. 2 to 9 for using the invention, unfold the folding plates 10, 11, and 12 of the folding plate assembly 1, and wrap the folding plates 10, 11, and 12 around an object to be locked and a fixed object, the insertion portion 110 of the movable folding plate 11 is inserted into the insertion groove 22 of the lock seat 2, the insertion hole 111 on the insertion portion 110 corresponds to the lock column 7 and the insertion hole 23 of the lock seat 2, the outwardly protruded lock core seat 4 is pressed toward the fixing sleeve 3, so that the lock column 7 is inserted into the insertion hole 111 of the movable folding plate 11 and the insertion hole 23 of the lock seat 2, and the compression spring 75 is compressed in a compressed state, and the positioning steel ball 45 on the lock core seat 4 corresponds to the positioning embedding groove 35 of the fixing sleeve 3. At this time, the positioning steel ball 45 no longer abuts against the wall surface of the chamber 32 of the fixing sleeve 3, the torsion spring 68 elastically restores and drives the connecting swivel 6 to rotate, the positioning steel ball 45 is pushed outward by rotation of the connecting swivel 6 and detached from the slot 62 of the connecting swivel 6, and is abutted by an outer wall surface of the protruding column 60 of the connecting swivel 6 and is embedded in the positioning embedding groove 35 of the fixing sleeve 3 (as shown in FIG. 5). When the connecting swivel 6 is driven by the torsion spring 68, the lock column 7 is also driven to rotate, so that the inlay 24 of the lock seat 2 is embedded in the embedding groove 73 at the end portion of the lock column 7 (as shown in FIG. 4), thereby locking action can be completed (as shown in FIG. 3). Please refer to FIG. 6 for unlocking, just use a key A to turn the lock core 5 to rotate, the lock rod 51 of the lock core 5 drives the connecting swivel 6 to rotate and causes the torsion spring 68 to be in a torsional state, and the slot 62 of the connecting swivel 6 is directly aligned with the steel ball hole 44 of the lock core seat 4 (as shown in FIG. 8). The positioning steel ball 45 moves toward the slot 62 of the connecting swivel 6, so that the positioning steel ball 45 is no longer embedded in the positioning embedding groove 35 of the fixing sleeve 3, the lock column 7 rotates with the connecting swivel 6, and the inlay 24 in the insertion hole 23 of the lock seat 2 is detached from the embedding groove 73 of the lock column 7 (as shown in FIG. 7). The compression spring 75 elastically restores and pushes the lock core seat 4 outward, so that the lock column 7 is detached from the insertion groove 22 of the lock seat 2 (as shown in FIG. 9), and the insertion portion 110 of the movable folding plate 11 can be moved out of the insertion groove 22 of the lock seat 2, thereby unlocking action can be completed. In addition to embedding, locking and fastening with the positioning steel ball 45, the invention is further provided with the inlay 24 in the insertion hole 23 of the lock seat 2, and the embedding groove 73 provided on the lock column 7, so that the end portion of the lock column 7 can be further embedded and fastened to prevent thieves from push-opening the insertion groove 22 of the lock seat 2, and the anti-drilling component 8 provided on the lock core seat 4 is capable of preventing thieves from damaging an internal structure of the lock core 5 by using a drill bit to achieve an optimum anti-theft efficacy of locking.

In summary, the invention has indeed achieved the intended object and efficacy of use, and is more ideal and practical than the prior art. However, the above-mentioned embodiment is merely specific descriptions of the preferred embodiment of the invention, the embodiment is not intended to limit the claims of the invention, and all other equivalent changes and modifications completed without departing from the technical means disclosed in the invention should be included in the claims covered by the invention.

What is claimed is:

1. A folding lock, comprising:

a folding plate assembly composed of a fixed folding plate, a movable folding plate, a plurality of intermediate folding plates and a plurality of rivets, the fixed folding plate, the movable folding plate and the intermediate folding plates being pivotally assembled by riveting with the rivets one by one, the fixed folding plate and the movable folding plate is respectively pivotally disposed on two outer sides of the intermediate folding plates, the fixed folding plate is fixedly provided with a connecting seat, the connecting seat is provided with a through hole, an outer end of the movable folding plate is disposed as an insertion portion, the insertion portion is provided with an insertion hole;

a lock seat disposed on an inner side of the connecting seat on the fixed folding plate, one end of the lock seat is provided with an accommodating groove, a wall surface of the lock seat is provided with an insertion groove, the accommodating groove communicating with the insertion groove, another end of the lock seat is provided with an insertion hole, the insertion hole of the lock seat communicating with the insertion groove, an inlay correspondingly protruding from an inner wall surface of the insertion hole;

a fixing sleeve located within the through hole of the connecting seat on the fixed folding plate and disposed in the accommodating groove of the lock seat, an outer wall surface of one end portion of the fixing sleeve is provided with a flange, an inside of the fixing sleeve is provided with a chamber, an outer end portion of the chamber of the fixing sleeve is provided with a ring groove, a wall surface of the chamber of the fixing sleeve is axially provided with a sliding groove, and vertically provided with an arcuate positioning embedding groove, another end portion of the fixing sleeve is provided with a perforation communicating with the chamber;

a lock core seat disposed in the chamber of the fixing sleeve, one end of the lock core seat is provided with a chamber, an inner wall surface of the chamber of the lock core seat is provided with a positioning slot, another end of the lock core seat is provided with a perforation communicating with the chamber, an outer wall surface of the lock core seat is provided with a positioning protrusion that is disposed in the sliding groove of the fixing sleeve, a wall surface of the lock core seat is provided with a steel ball hole communicating with the perforation of the lock core seat, an inside of the steel ball hole is provided with a positioning steel ball, another end face of the lock core seat is provided with a fixing insert hole;

a lock core disposed in the chamber of the lock core seat, one end of the lock core is provided with a key hole, another end of the lock core is provided with a lock rod, the lock rod is provided with a notch, a wall surface of the lock core is provided with an embedding rod that is embedded in the positioning slot of the lock core seat;

a connecting swivel assembled on the lock core seat, one end of the connecting swivel is provided with a protruding column, the protruding column of the connecting swivel is located in the perforation of the lock core seat, an inside of the protruding column of the connecting swivel is provided with a lock rod hole in which the lock rod of the lock core is located, the protruding column of the connecting swivel is provided with a slot, another end of the connecting swivel is provided with a connecting protrusion, an inside of the connecting protrusion is provided with a perforation, a first pin hole is disposed on a wall surface of the connecting swivel, a first fixing pin is disposed in the first pin hole, the first fixing pin is located in the notch of the lock rod of the lock core, a second pin hole is provided on a wall surface of the connecting protrusion, a second fixing pin is disposed in the second pin hole, a fixing insert hole is disposed on an end face of the connecting swivel, a torsion spring is disposed between the connecting swivel and the lock core seat, one end of the torsion spring is embedded in the fixing insert hole of the connecting swivel, another end of the torsion spring is embedded in the fixing insert hole of the lock core seat;

a lock column disposed on the connecting swivel, one end of the lock column is provided with a protruding column, the protruding column of the lock column is disposed in the perforation of the connecting swivel, the protruding column of the lock column is provided with a pin hole in which the second fixing pin on the connecting swivel is located, the lock column is provided with a retaining edge, another end portion of the lock column is provided with an embedding groove, a cut surface is provided on a wall surface of the other end portion of the lock column corresponding to a position of the inlay in the insertion hole of the lock seat, a compression spring is sleeved on the connecting swivel and the lock column; and a fixing collar disposed in the chamber of the fixing sleeve, a C-shaped fastening ring is disposed on a wall surface of the fixing collar, and the C-shaped fastening ring is embedded in the ring groove of the fixing sleeve.

2. The folding lock as claimed in claim 1, wherein an outer end portion of the through hole of the connecting seat of the folding plate assembly is provided with a retaining edge, the flange of the fixing sleeve is retained and positioned by the retaining edge of the connecting seat, a spiral flange is disposed on a wall surface of the accommodating groove of the lock seat, and a spiral embedding groove for fitting with the spiral flange of the lock seat is disposed on the outer wall surface of the fixing sleeve.

3. The folding lock as claimed in claim 1, wherein at least one pin hole is provided on a wall surface of one end portion of the lock core seat, an inside of the pin hole is provided with a fixing pin, an anti-drilling component is provided on the lock core seat, the anti-drilling component is provided with a protrusion, the protrusion of the anti-drilling component is disposed in the chamber of the lock core seat, the protrusion of the anti-drilling component is provided with a ring groove in which the fixing pin of the lock core seat is located, and the anti-drilling component is provided with a key insertion hole.

* * * * *